No. 790,394. PATENTED MAY 23, 1905.
E. F. PRICE.
PROCESS OF SMELTING REFRACTORY ORES.
APPLICATION FILED NOV. 7, 1904.
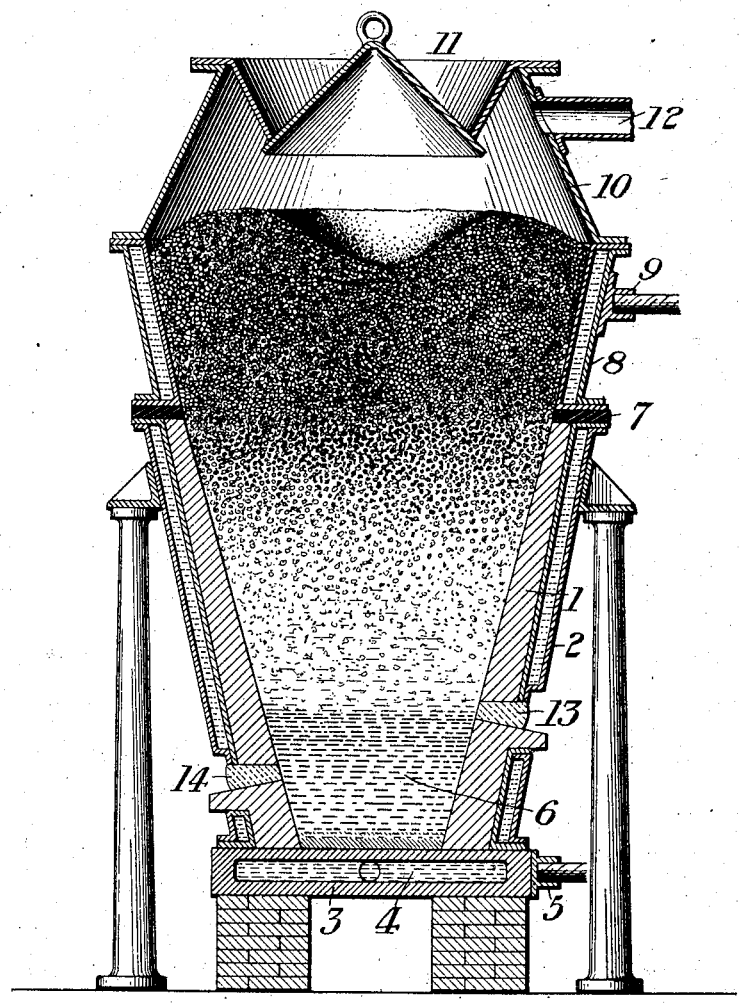
Witnesses:
R A Balderson
J. B. Hill
Inventor:
Edgar F. Price,
by Byrnes & Townsend,
Att'ys.

No. 790,394.

Patented May 23, 1905.

UNITED STATES PATENT OFFICE.

EDGAR F. PRICE, OF NIAGARA FALLS, NEW YORK.

PROCESS OF SMELTING REFRACTORY ORES.

SPECIFICATION forming part of Letters Patent No. 790,394, dated May 23, 1905.

Application filed November 7, 1904. Serial No. 231,736.

*To all whom it may concern:*

Be it known that I, EDGAR F. PRICE, a citizen of the United States, residing at Niagara Falls, in the county of Niagara and State of New York, have invented certain new and useful Improvements in Processes of Smelting Refractory Ores, of which the following is a specification.

United States Patent No. 750,096, granted January 19, 1904, to Alfred H. Cowles, describes a process of smelting refractory compounds by passing an electric current through a body of the charge acting as a resistance-conductor and increasing the current density along the path of the current to a point where the heat generated by the resistance of the body effects reduction. The electric current is passed through the charge by means of carbon electrodes, the upper electrode being a carbon ring surrounding the charge and constituting the upper part of the stack-furnace and the lower electrode being the carbon hearth of the furnace. Carbon electrodes of the size and character required for this purpose are expensive and perishable. It is difficult to obtain large blocks of carbon of uniform composition, and the carbon is rapidly worn away by the attrition of the charge and its products and in many cases reacts chemically therewith.

According to the present process an electrically-conductive charge of a refractory ore or ores and a reducing agent are interposed between water-cooled metal electrodes and smelted by the heat generated by the resistance of the charge. The charge is preferably a downwardly-converging vertical column, fed through and in contact with the upper electrode. The lower electrode is of metal and preferably consists of a body of a molten metal or alloy supported on a metal plate which is artificially cooled. A metal or alloy containing a minimum or definite percentage of carbon may be produced by employing a charge containing a predetermined amount of carbon.

A suitable incandescence-furnace is shown in the accompanying drawing, in which the figure is a vertical axial section.

The furnace is a vertical stack comprising a downwardly-converging body 1 of refractory non-conductive material—such as magnesia, chromite, or siloxicon—surrounded by a water-jacket 2. The body is supported upon a horizontal metal plate 3, preferably of cast-steel, having a chamber 4 for the circulation of water and an electric terminal 5. A body 6, of a molten metal or alloy, is supported on the plate 3. This molten body may consist of the metal or alloy to be produced, of a metal which will alloy with the reduced product, or of a metal which will not alloy or combine with the reduced product. The molten body and support-plate constitute the lower electrode of the furnace. Supported upon the body 1 but insulated therefrom by a layer 7 of refractory non-conductive material is the upper electrode 8, a downwardly-converging water-jacketed iron ring having a terminal 9, the inner surface of the ring being bare, so that it may contact with the charge. Supported upon the electrode-ring 8 is an iron ring 10, which carries a bell-and-hopper charging mechanism 11. An outlet-flue 12 for waste gases extends from the ring 9. Tap-holes 13 14 extend laterally through the body 1 at different heights.

In employing this furnace to carry out the process a charge which is electrically conductive or which will be converted into a conductor by the temperature of the furnace—for example, a mixture of magnetite, silica, and carbon for the production of ferrosilicon—is fed into the stack until its upper portion lies in contact with the electrode-ring 8. If the charge is normally a poor conductor, initial current-paths between the electrodes are provided. The conductivity of the charge may be increased by using a mixture containing large pieces of coke, which lie in contact with each other at various points, and thereby afford direct paths for the flow of current. An electric current of sufficient amperage is then passed from the upper electrode through the charge to the body of molten metal 6, which for the example given will preferably consist of ferrosilicon. The charge serves as a resistance-conductor in which the temperature gradually rises downwardly by reason of the decreasing cross-section and increasing current density to a zone where reduction of the iron and silicon is effected. In normal operation the major portion of the body of metal 6 will be maintained in a molten condition by the heat of the charge, the lower portion being pasty or solid on account of the water circulated through the hearth. The reduced iron and silicon form a molten alloy, which collects in the lower part of the furnace and may be withdrawn through the tap-hole 13, fresh charge material being fed into the furnace as required. The process is thus a continuous one. The waste gases passing up from the zone of reduction through the charge serve to preheat it and are withdrawn through the flue 12 and utilized for fuel. The height and resistance of the column of charge can be varied to regulate the necessary voltage by varying the height of the body of metal 6.

It will be obvious that ferrosilicon may also be produced by smelting a charge of silica and carbon and employing a body 6 of molten iron. The iron will then alloy with the reduced silicon and may be replenished by supplying metallic iron with the charge.

By employing a charge containing a predetermined amount of carbon it is possible to produce a metal or alloy containing a minimum or definite percentage of carbon. The use of electrodes of metal, and especially of a metallic electrode in contact with the molten metal or alloy reduced from the charge, is a decided improvement over the use of electrodes of carbon, which would dissolve in the product and give it a high and variable percentage of carbon.

The process is applicable to the reduction of various refractory ores—such as those of chromium, titanium, vanadium, aluminium, calcium, boron, &c.—and the metallic product may be either a single metal or an alloy or compound of metals or metalloids, such as a silicid, carbid, or borid.

The reduction of iron ores by this process is specifically claimed in my application, Serial No. 229,167, filed October 19, 1904, and the reduction of calcium compounds for the production of calcium carbid is claimed in my application, Serial No. 229,168, filed October 19, 1904.

I claim—

1. The process of smelting refractory ores, which consists in interposing a charge of the ore and a reducing agent as a resistance-conductor between electrodes, one of said electrodes being of metal and comprising a liquid portion and a solid portion, electrically heating said charge to the temperature requisite for reduction, and cooling the solid portion of said metal electrode, as set forth.

2. The process of smelting refractory ores, which consists in interposing a charge of the ore and a reducing agent as a resistance-conductor between superposed electrodes, the lower electrode being of metal and comprising a liquid portion and a solid portion, electrically heating said charge to the temperature requisite for reduction, and cooling the solid portion of the lower electrode, as set forth.

3. The process of smelting refractory ores, which consists in interposing a charge of the ore and a reducing agent as a resistance-conductor between superposed electrodes, the lower electrode being of metal and comprising a liquid portion and a solid portion, electrically heating said charge to the temperature requisite for reduction, cooling the solid portion of the lower electrode, permitting the molten product to settle and collect upon the lower electrode, and removing the product and supplying fresh charge materials as required, as set forth.

4. The process of smelting refractory ores, which consists in interposing a charge of the ore and a reducing agent as a resistance-conductor between superposed electrodes, the lower electrode being of metal and comprising a liquid portion and a solid portion, electrically heating said charge to the temperature requisite for reduction, cooling the solid portion of the lower electrode, permitting the molten product to settle and collect upon the lower electrode, removing the product and supplying fresh charge materials as required, and moving the charge substantially along the path of current-flow, as set forth.

5. The process of smelting refractory ores, which consists in interposing a charge of the ore and a reducing agent as a resistance-conductor between electrodes, one of said electrodes being of metal and comprising a liquid portion and a solid portion, electrically heating said charge to the temperature requisite for reduction by an electric current the density of which increases through the charge, and cooling the solid portion of said metal electrode, as set forth.

6. The process of smelting refractory ores, which consists in interposing a charge of the ore and a reducing agent as a resistance-conductor between superposed electrodes, the lower electrode being of metal and comprising a liquid portion and a solid portion, electrically heating said charge to the temperature requisite for reduction by an electric current the density of which increases through the charge, cooling the solid portion of the lower electrode, permitting the molten product to settle and collect upon the lower electrode, removing the product and supplying fresh charge materials as required, and moving the charge substantially along the path of current-flow, as set forth.

7. The process of smelting refractory ores and producing metals or alloys containing a minimum or definite percentage of carbon, which consists in interposing a charge of the ore and a predetermined amount of carbon as a resistance-conductor between metal electrodes, electrically heating said charge to the temperature requisite for reduction, and cooling the electrodes to maintain them at a relatively low temperature, as set forth.

8. The process of smelting refractory ores and producing metals or alloys containing a minimum or definite percentage of carbon, which consists in interposing a charge of the ore and a predetermined amount of carbon as a resistance-conductor between electrodes, one of said electrodes being of metal and comprising a liquid portion and a solid portion, electrically heating said charge to the temperature requisite for reduction, and cooling the solid portion of said metal electrode, as set forth.

9. The process of smelting refractory ores and producing metals or alloys containing a minimum or definite percentage of carbon, which consists in interposing a charge of the ore and a predetermined amount of carbon as a resistance-conductor between superposed electrodes, the lower electrode being of metal and comprising a liquid portion and a solid portion, electrically heating said charge to the temperature requisite for reduction, cooling the solid portion of the lower electrode, permitting the molten product to settle and collect upon the lower electrode, and removing the product and supplying fresh charge materials as required, as set forth.

10. The process of smelting refractory ores and producing metals or alloys containing a minimum or definite percentage of carbon, which consists in interposing a charge of the ore and a predetermined amount of carbon as a resistance-conductor between metal electrodes, electrically heating said charge to the temperature requisite for reduction by an electric current the density of which increases through the charge, and cooling the electrodes to maintain them at a relatively low temperature, as set forth.

11. The process of smelting refractory ores and producing metals or alloys containing a minimum or definite percentage of carbon, which consists in interposing a charge of the ore and a predetermined amount of carbon as a resistance-conductor between superposed electrodes, the lower electrode being of metal and comprising a liquid portion and a solid portion, electrically heating said charge to the temperature requisite for reduction by an electric current the density of which increases through the charge, cooling the solid portion of the lower electrode, permitting the molten product to settle and collect upon the lower electrode, removing the product and supplying fresh charge materials as required, and moving the charge substantially along the path of current-flow, as set forth.

In testimony whereof I affix my signature in presence of two witnesses.

EDGAR F. PRICE.

Witnesses:
   G. E. Cox,
   D. Burgess.